Jan. 2, 1934. L. B. GREEN 1,941,797
RADIATOR SHELL AND GRILLE ASSEMBLY
Filed Dec. 7, 1932 4 Sheets-Sheet 1
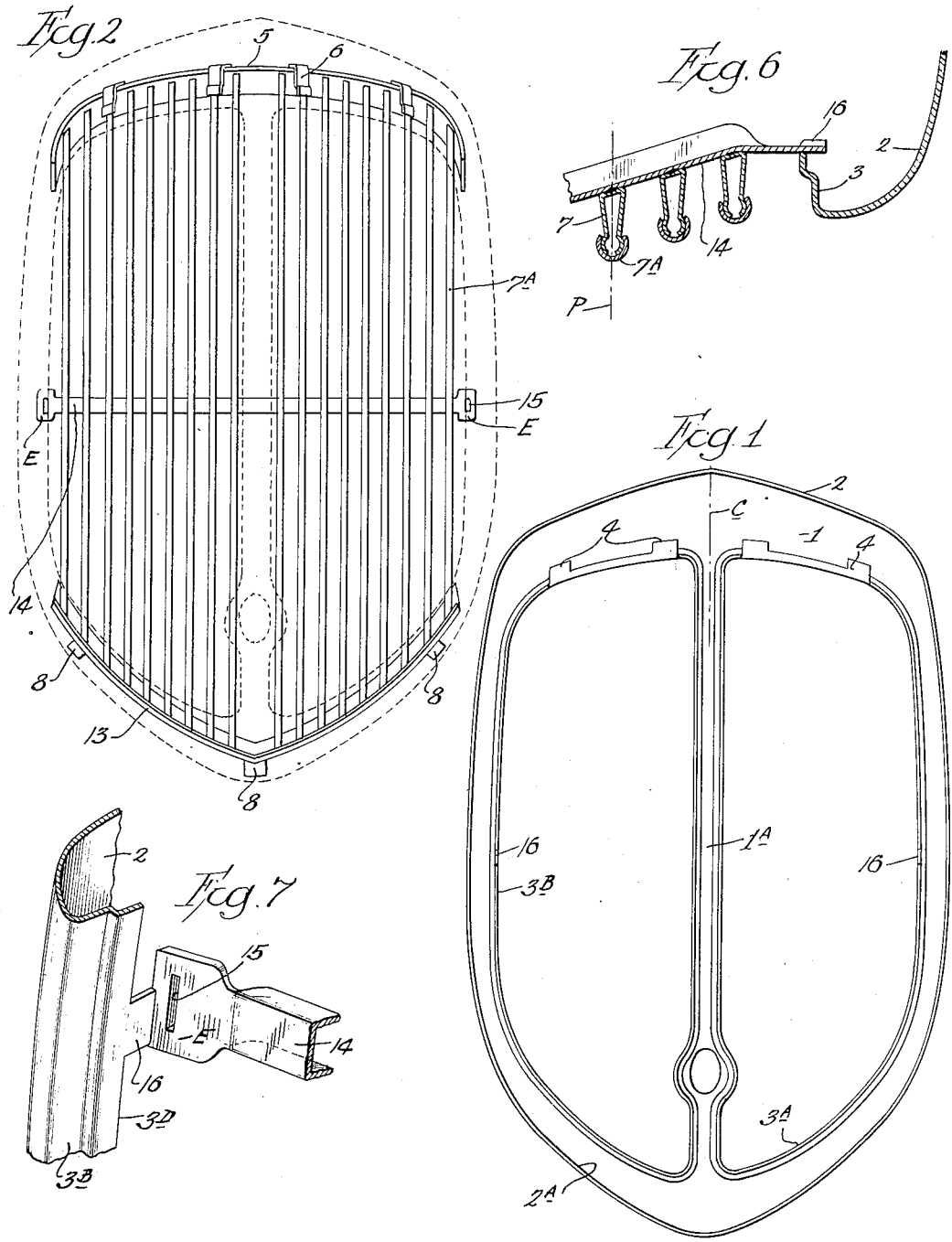
Inventor:
Lee B. Green
by Albert Scheible
Attorney

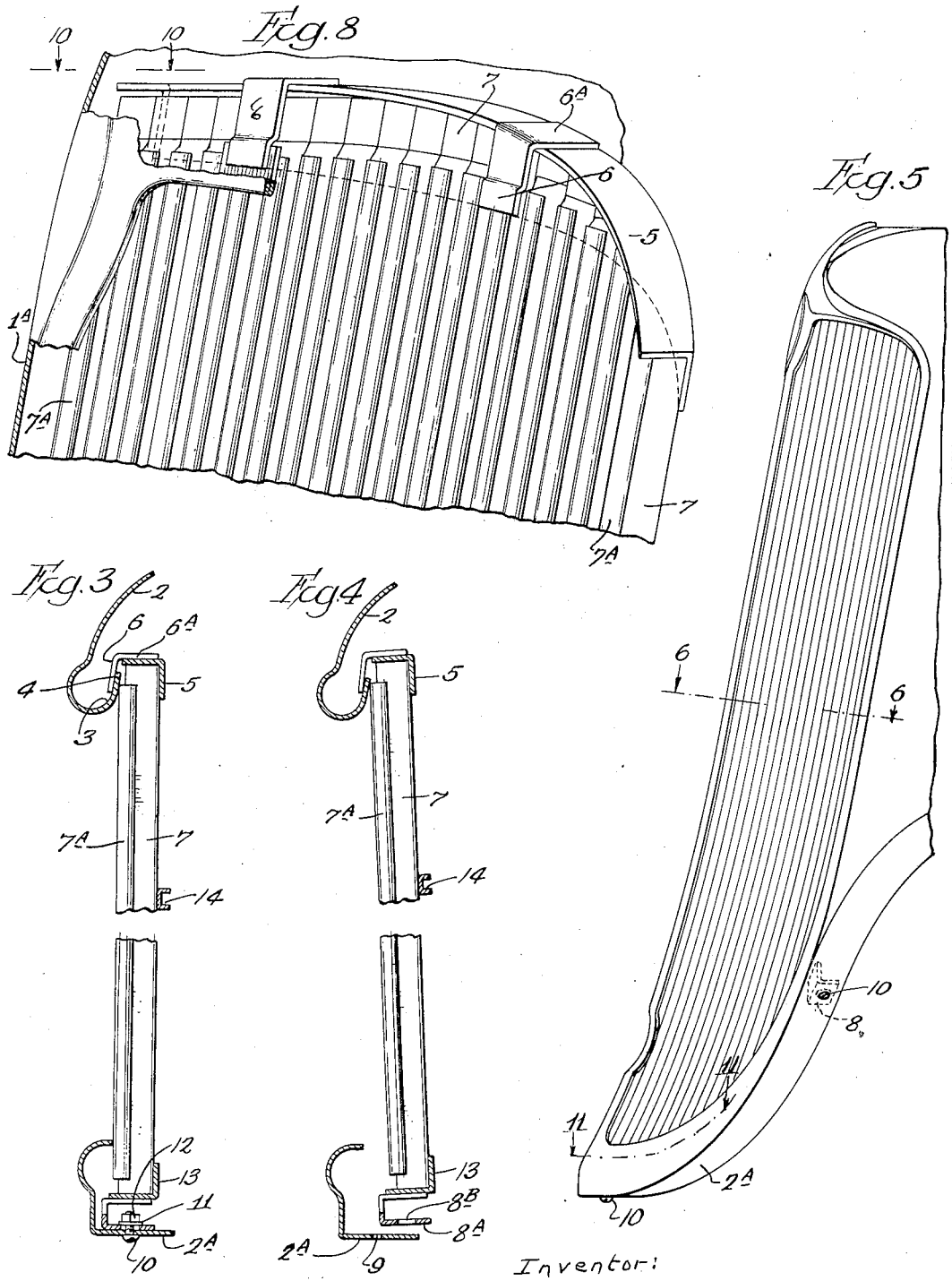

Jan. 2, 1934. L. B. GREEN 1,941,797
RADIATOR SHELL AND GRILLE ASSEMBLY
Filed Dec. 7, 1932 4 Sheets-Sheet 3
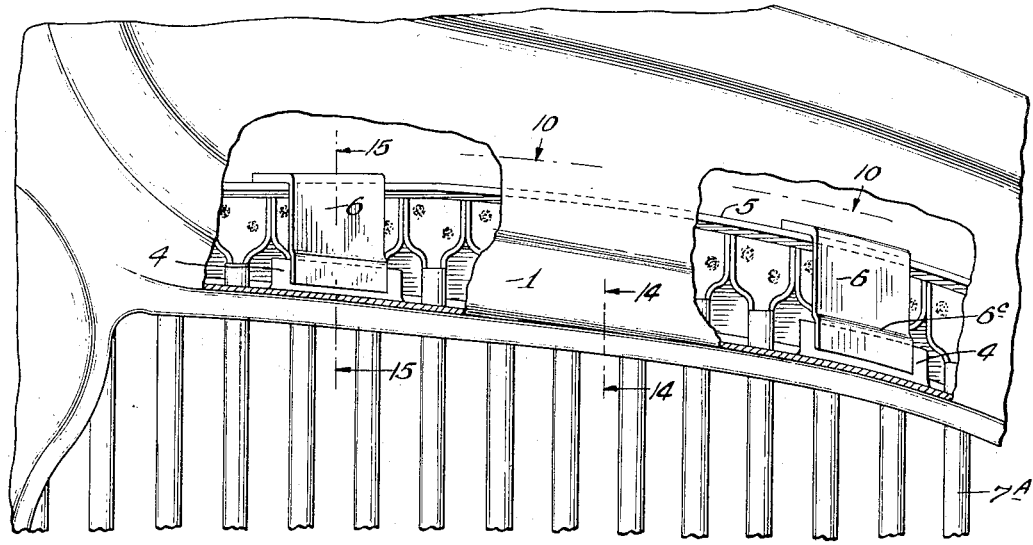
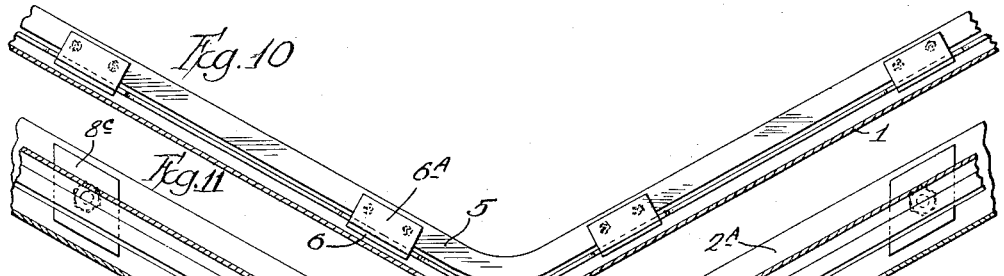
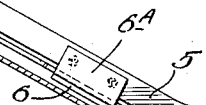
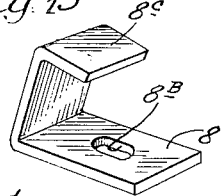
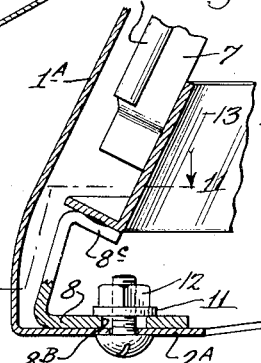
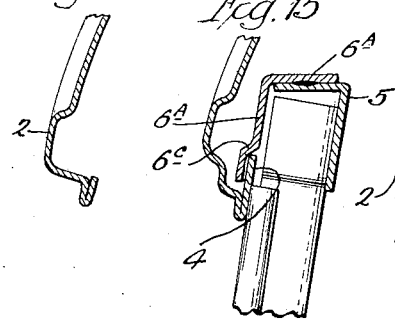
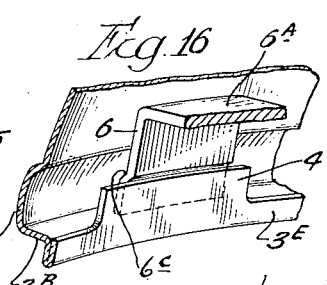
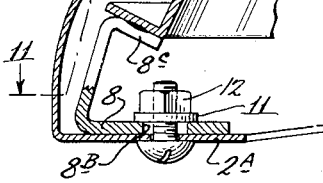
Inventor:
Lee B. Green
by Albert Scheible
Attorney

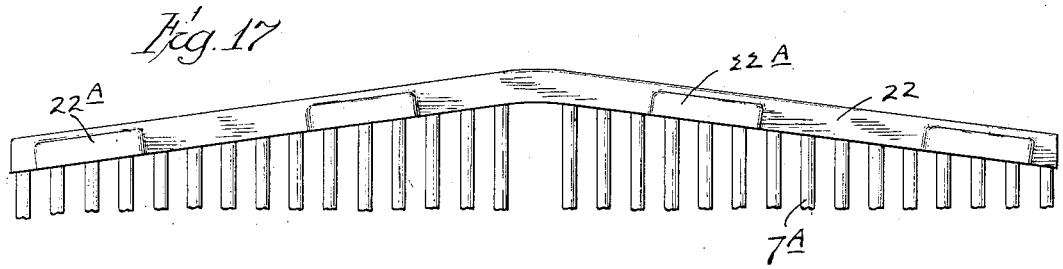
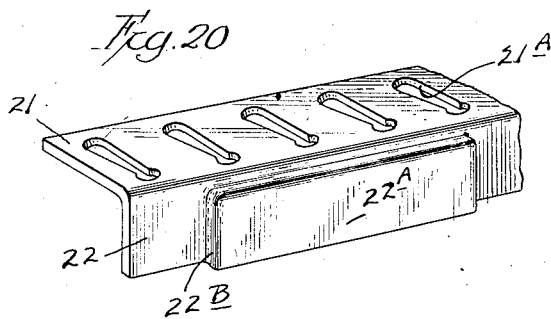
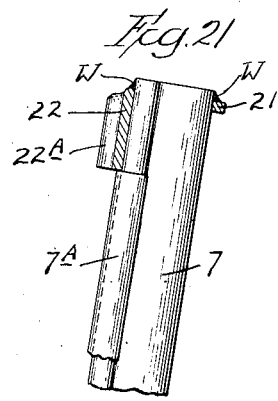
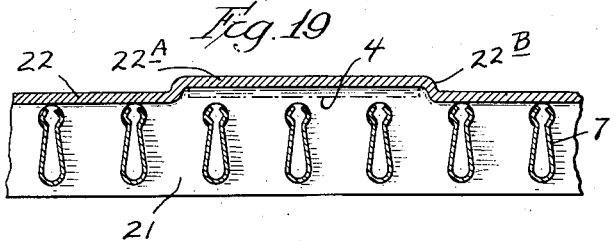
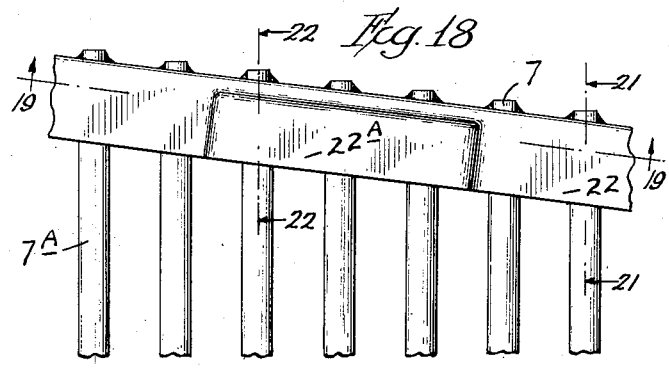
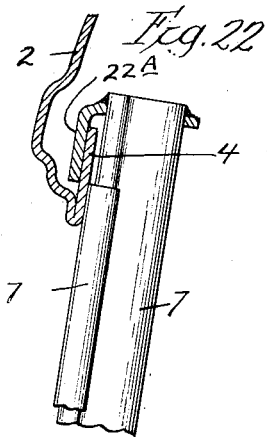
Inventor:
Lee B. Green Patented Jan. 2, 1934

1,941,797

UNITED STATES PATENT OFFICE 1,941,797

RADIATOR SHELL AND GRILLE ASSEMBLY

Lee B. Green, Lakewood, Ohio, assignor to The Globe Machine & Stamping Company, Cleveland, Ohio, a corporation of Ohio Application December 7, 1932. Serial No. 646,161

25 Claims. (Cl. 293—54)

My invention relates to frontal finishing assemblies for substantially concealing and guarding the radiator of an automobile, its general object being that of providing simple and inexpense means whereby a separately manufactured grille or other guard member can readily be detachably secured to and within the radiator shell front (or behind any other frontal finishing part of the housing for the radiator) without disfiguring such a frontal part.

With passenger automobiles, the use of either a woven wire grille or a louver-type grille has long been found desirable for substantially concealing the fins of the radiator which otherwise are clearly visible through the air-admitting frontal opening of the radiator shell or other housing, for guarding the radiator against impact by gravel, and for reducing the extent to which fallen leaves might clog the air passages of the radiator.

When constructed for attachment to the radiator shell from the front of the latter, such grilles usually have the objections that either the end bars or the complete frame supporting the main (woven wire or louver bar) portion of the grille are exposed to view, so that these portions also must be plated at considerable added cost to prevent their detracting from the appearance of the radiator shell front; and even when thus plated, the exposed entire frame or mere end bars of the grille may detract from the looks of the radiator front, particularly when the latter is of an ornamental design.

In addition, a frontal attaching of a grille or other guard usually requires the use of many bolts extending through the shell front and presenting forwardly projecting heads which also may not harmonize with the general design, and such a frontal attaching makes it easy for an accessory thief to remove and steal the guard.

And even when such a grille or guard is disposed behind the front of the radiator shell and attached to the latter, the attaching means usually include forwardly projecting bolts or else require auxiliary brackets to be provided within the radiator shell; and the use of either rivets, bolts or welding for attaching these brackets to the shell is apt to mar the shell front, this being particularly true when that front is formed of rather thin sheet metal.

Another objection commonly encountered when a grille or other guard is fastened to a radiator front by horizontal bolts extending through alined perforations in that front and in frame members of the grille, is this: The weight of the grille is then supported by the lower halves of bolts extending through the thin metal of the shell, so that the jarring of the car soon vertically elongates the perforations through which the bolts extend, thereby allowing the grille to slide and rattle. Such a loosening of the grille may be avoided by a direct welding of the frame members of the grille to the rear face of the shell front. But this has likewise proven objectionable, because any spot-welding operation usually indents, discolors or otherwise mars the outer face of that front, particularly when the latter has previously been plated; and also because it makes it impossible to detach and replace the grille later on, or to substitute a shutter for it when winter arrives, without disfiguring the shell.

My present invention aims to overcome all of the above recited objections to the heretofore customary grille-attaching arrangements by providing a radiator front and guard assembly which will permit the grille to be attached speedily from the rear of that front, which will afford a rigid supporting of the grille while requiring very few fastening elements and while substantially concealing these elements, and which will not require any supplemental parts to be riveted, welded or otherwise attached to the radiator front prior to the attaching of the grille to that front.

In addition, my invention aims to provide a radiator front and grille assembly in which the grille can readily be attached to the said front by hooking upper portions of the grille upon normally concealed hook-engaging parts on the radiator front and thereafter fastening lower portions of the grille to the lower portions of the radiator front. My invention also aims to provide a construction which will compensate for slight variations in the dimensions of the manufactured parts, which will insure a tight pressing of portions of the grille bars in a louver-type grille against the radiator front to avoid rattling, and which will allow the attached grille to seat on the bottom flange of the radiator front so as to have this flange sustain the major portion of the weight of the grille, thereby permitting integral parts of the radiator front to be employed for some of the interhooking elements even when this front is formed of relatively thin metal.

Furthermore, my invention aims to provide a radiator front and hook-on grille assembly in which the grille-hook engaging portions of the grille can be cheaply formed as integral parts of the radiator front, and in which the hooking interengagement of relatively few portions of the grille and the radiator front will cooperate with quite few fastening elements for preventing a lateral shifting of the grille with respect to the radiator front. In this aspect, my invention also aims to provide a radiator front and louver-type grille assembly in which one of the connecting members also serves as a rigid midheight spacer for the louver bars, thereby permitting these louver bars to be made of relatively light metal without requiring a complete frame for imparting the needed rigidity to the grille.

Illustrative of my invention

Fig. 1 is a rear elevation of a suitably constructed radiator-finishing front member.

Fig. 2 is a somewhat diagrammatic front elevation of the corresponding grille, with dotted lines showing the contour of the front member shown in Fig. 1.

Fig. 3 is a somewhat diagrammatic vertical section showing the manner in which the upper portion of the grille is hookingly connected to the front member and the fastening means connecting the grille with the lower portion of the grille.

Fig. 4 is a section similar to Fig. 3, showing the grille as it appears when first hooked to the grille and before a fastening bolt is attached.

Fig. 5 is a side elevation of a commercial radiator front and grille assembly embodying my invention.

Fig. 6 is an enlarged and fragmentary horizontal section taken along the line 6—6 of Fig. 5 and along the longitudinal axis of a louver-tying bar adjacent to the midheight of the grille.

Fig. 7 is a fragmentary perspective view of the opposite end portion of the louver-tying bar and the part of the front member with which it is interlocked.

Fig. 8 is an enlargement of the upper portion of Fig. 5 with parts of the front member broken away.

Fig. 9 is a similarly enlarged front elevation of upper portions, with parts of the front member broken away.

Fig. 10 is a fragmentary horizontal section taken along the line 10—10 of Fig. 9, but drawn on a smaller scale than Fig. 9, showing the upper end bar of the grille, the hook tongues on this end bar, and the adjacent portions of the front member.

Fig. 11 is a horizontal section taken through the riser flange of the lower end member of the grille and the adjacent part of the front member, along the line 11—11 of Figs. 5 and 12.

Fig. 12 is an enlarged vertical section taken through a bottom portion of the front and shell assembly parallel to the medial plane of one of the louver bars.

Fig. 13 is a perspective view of one of the brackets at the lower end of the grille.

Fig. 14 is an enlarged vertical section taken along the line 14—14 of Fig. 9, showing the general section of the flange at the upper edge of the air-admitting opening in the front member.

Fig. 15 is a similar section taken along the line 15—15 of Fig. 9 through one of the extension fingers on the same flange, and also showing adjacent portions of the grille.

Fig. 16 is a fragmentary rear perspective view of the interhooking elements in Fig. 15.

Fig. 17 is a front elevation of the upper portion of a grille designed for embodying my invention, in which portions of a frontal flange on the upper cross-member of the grille are formed for hooking over extension fingers on the radiator shell and for preventing a lateral shifting of the grille with respect to the radiator shell.

Fig. 18 is an enlargement of a right-hand portion of Fig. 1.

Fig. 19 is a section taken along the line 19—19 of Fig. 18, looking upwards, with dotted lines showing the adjacent extension finger on the radiator shell front.

Fig. 20 is a perspective view of a left-hand portion of the upper cross-member of the grille, showing this before the grille plates are attached to it.

Fig. 21 is a section taken along the line 21—21 of Fig. 18, in the medial plane of one of the grille blades.

Fig. 22 is a section taken along the line 6—6 of Fig. 2 through interhooked portions of both the grille and the radiator shell front.

Generally speaking, I accomplish the numerous objects of my invention by the following provisions, shown somewhat diagrammatically in Figs. 1 to 4:

First, I provide the sheet metal front member 1 of my radiator finishing assembly with the usual air-admitting opening, here shown as subdivided by a medial stiffening strip portion 1A, and also provide this front member with the usual rearwardly extending peripheral flange 2. In addition, I form the front member with a continuous rearwardly directed flange 3 bordering the said opening; and on the parts of this flange at the upper edge of the opening I provide laterally spaced and upwardly directed flange extensions or fingers 4, which fingers preferably are symmetrically disposed with respect to the vertical center line C of this front member.

On a corresponding louver-type grille, I provide the upper end member 5 with forwardly and downwardly directed tongues 6, spaced similarly to the aforesaid fingers 4, each of which tongues may be the forward portion of a stiff metal bar having its rearward portion 6A welded to the said end member. These tongues preferably are so disposed with respect to the louver bars or blades of the grille that parts of the flange 3 on the front member will bear against the forward edges of the louver bars when the tongues 6 are hooked over the flange-extension fingers 4, so that these fingers will be effectively clamped between certain louver bars and the depending tongues 6 on the grille. And when each louver bar consists of a main bar 7 ornamented at its forward edge by a chrome-plated (or otherwise differently colored) sheath 7A, the parts can be proportioned so that the flange fingers 4 bear against these ornamental louver bar parts 7A as shown in Fig. 3.

To insure this gripping of the flange fingers, I make the grille of such an effective height that its lowermost portions will be freely spaced upwardly from the adjacent parts of the flange 2, namely from the rearward directed bottom flange parts 2A, when the grille is first hooked upon the fingers 4 as shown in Fig. 4. Then I provide fastening means arranged for pulling the grille downwards after the hooked-on grille has been swung (clockwise in Fig. 4) until the frontal bar parts 7A also engage the part 3A of the rearwardly directed flange along the lower edge of the air-admitting opening, so that a tightening of the fastening means will jam the hook-engaging fingers 4 as heretofore described and also will cause the lowermost portions of the grille to seat on the bottom flange 2A of the front member.

To permit a ready adaptation of my invention to radiator fronts of widely varying contours, and to reduce the needed lengths of the louver bars (or other guard-forming elements of the grille), I desirably construct the grille with brackets underhanging and fastened to the lower end bar 13 of the grille, each of which brackets has a foot portion 8A provided with an upright perforation 8B. Then I provide the bottom flange 2A with perforations 9 spaced so that they can aline respectively with the bracket-foot perforations for receiving bolts 10. To insure a firm fastening while allowing for possible manufacturing variations, I preferably make each flange perforation 9 cylindrical and of a size slidably fitting the shank of the bolt 10, but elongate each bracket foot perforation 8B (as shown in Fig. 13) in a direction at right angles to the general plane of the grille. I also interpose a lock-washer 11 between the nut 12 of the bolt and the adjacent bracket foot, as shown in Fig. 12.

With the parts of the front member thus conformingly shaped and with both the interhooking elements and the feet-affording brackets symmetrically disposed, as in Figs. 1 and 2, the weight of the grille is supported by the bottom flange 2A so as not to impose any undue strains on the hook fingers 4; and since these fingers can be disposed substantially upright, the usual thickness of metal employed for such automobile radiator fronts has ample strength to withstand the strains due to a jarring of the car.

Moreover, if the upper edge portions of the air-admitting opening do not extend in horizontal alinement, as in the hereafter described commercial embodiment, the corresponding lack of alinement of the interhooking elements on the front member of the grille will in itself deter any lateral shifting of the grille. However, I desirably supplement my previously described assemblage by additional fastening means interposed intermediate of the height of the grille and composed of integral elements of the front member and the grille.

For this purpose, I desirably provide a tie-bar 14 extending approximately at mid-height of the grille behind, and at right angles to, all of the louver bars 7 and suitably secured to these bars (as by the welds W of Fig. 21). Each end of this tie-bar extends beyond one lateral edge of the grille and is perforated so that each such end forms an eye, and the bore of each such eye preferably is a vertically elongated slot 15 presenting upright walls parallel to the medial planes P of the louver bars (Fig. 6) or at right angles to the general plane of the grille. Then I provide the portions of the opening-bordering flange 3B at each side of the opening and at an elevation corresponding to that of the tie-bar with rearwardly extending guide fingers 16 (Fig. 7), each of which slidably fits one of the said eyes on the tie-bar.

To enhance the stiffening effect of the tie-bar on the louver bars, I desirably make this bar of a rearwardly open channel section, and also form the end portions of the bar so that they will bear forwardly against the rear edge portions 3D of the flange 3B both above and below each finger 16. When the grille then has been fastened in position by the bolts 10, the projecting tip portions of the fingers 16 (which are made longer than the thickness of the eyes E of the tie-bar) can be bent over against the rear faces of these eyes, so as to clamp the tie-bar to midheight portions of the front member at both sides of the air-admitting opening. With the guide fingers 16 fitting the bores 15 of the said eyes, these fingers then also latch the grille against both lateral and vertical movement with respect to the front member. And, since both the non-planar arrangement of the previously described interhooking elements and the clamping of the grille to the bottom flange likewise deter such shifting, even a severe rocking or surging of the car will not overstrain either these guide fingers or the more elevated hook-engaging fingers on the front member.

Moreover, while Figs. 1 to 4 illustrate the use of my invention in connection with a generally flat frontal member and with a grille having the forward edges of its louver bars in a common plane, my heretofore described features also can readily be employed with grilles and radiator shells of widely varying shapes and contours.

For example, Fig. 5 and Figs. 8 to 16 inclusive show my invention as embodied in an automobile radiator finishing assembly which presents a V-shaped horizontal section and in which the louver bars not only slope forwardly downwards, but also have their lower portions curved in side elevation. This commercial embodiment includes the following additional refinements:

To stiffen both the hook-engaging fingers 4 and the adjacent portion 3B of the flange along the upper edge of the air-admitting opening in the front member, this flange has its rearward portion doubled upon itself to present an inner upright flange 3E (Fig. 16) of which the fingers 4 are upward extensions. Also, each hook-like tongue 6 mounted on the upper end bar 5 of the grille includes intermediate of its height an inclined portion 6C (Figs. 15 and 16) which seats on the upper end of the corresponding finger 4, so that the sloping of this tongue part exerts a cam action during the downward pulling of the grille for drawing the upper end of the grille forwardly against the inner flange 3E. Each finger 4 may also be of greater width than the corresponding hook tongue, so as to allow for possible variations in the spacings of these elements.

With such a general shaping as in Fig. 5, the louver bars are disposed oblique to the bottom flange 2A. To allow for this while still making the lower end bar 13 a right-angled angle bar, I form each foot-affording bracket 8 on the grille so that the foot thereof will extend at a suitable angle to the upper web 8C of the bracket, according to the location of the bracket, as shown for example in Fig. 12.

For such a V-front effect, the upper end bar 5 and the lower end bar 13 may each be a single-piece angle bar, bent to a horizontally V-shaped form, as shown in Figs. 10 and 11; and each of these bars can likewise be suitably curved in front or side elevation to conform to the general configuration of the front member, as shown for the upper end member 5 in Figs. 8 and 9.

Since the heads of the bolts 10 are the only outwardly exposed parts of the fastening means, and since these underhang the bottom flange so that they cannot easily be seen, my grille-supporting arrangement presents no elements which could mar the appearance or detract from the selected ornamental design of the radiator finishing assembly. And, since the attaching of the grille involves only the inserting and tightening of a few bolts and the clinching of the guide fingers against the eyes of the tie-bar on the grille, the entire assembling of my radiator front and grille consumes far less time than the heretofore employed arrangements for this purpose.

In addition, I entirely avoid the preliminary fastening of any auxiliary parts to the radiator front, either by welding, riveting or otherwise, so that I also eliminate the disfiguration which so commonly occurs when such auxiliary elements are attached to an already plated radiator front.

Moreover, while I am illustrating a frontal member having only a narrow rearwardly extending flange, my grille-attaching means can be employed with equal facility if this flange is widened, hence I am using the term "front member" in the generic sense in which it would include what is commonly called a radiator shell. So also, I do not wish to be limited to the above described details of construction and arrangement, since many changes might be made without departing either from the spirit of my invention or from the appended claims.

For example, Figs. 17 to 22 show some structural details of a present commercial embodiment of my invention, namely one in which the front member 1 (including its hooking fingers 4) as well as the louver bars slope forwards downwardly, and in which the blade parts 7 of these bars extend through perforations 21A in the upper end bar 21 of the grille after the manner claimed in my copending application #646,160.

This upper end bar 21 is of an angle-section presenting a flange 22 depending from its front edge, the major portion of this flange being close to the forward edges of the louver bars to permit the use of a narrow and hence light end bar. The depending flange has spaced portions 22A thereof offset forwardly to permit one of the shell-flange extension fingers 4 to extend behind each such portion, as shown in Fig. 22, the several portions 22A being spaced to correspond to the spacing of the said shell fingers as in Fig. 1.

Thus arranged, the said portions 22A of the depending flange on the upper end bar of the grille function after the general manner of the tongues 6 in Fig. 2, but are integral parts of the end bar and greatly stiffened by the flange parts 22B (Fig. 19) which connect each end of one of the forwardly offset portions 22A with adjacent portions of the flange 22. Moreover, by making the interior width of each of these offset portions 22A only slightly greater than that of the shell finger 4 associated with it, I enable the user to position the grille accurately laterally of the front member of the car when hooking the grille to that member.

I claim as my invention:

1. A finishing assembly for a radiator, comprising a front member provided with an air admitting opening, and a detachable grille disposed behind the front member; the grille including an upper and a lower end bar, and a guard portion spanning these bars; the front member having laterally spaced portions adjacent to the upper edge of the said opening interhooked with the said upper end bar; and fastening means interposed between the lower end bar and the front member for drawing the grille downwardly to maintain the said interhooking.

2. A radiator finishing assembly as per claim 1, in which the front member has rearwardly directed portions underhanging the grille, upon which last named portion the grille seats when the fastening means are tightened.

3. A radiator finishing assembly as per claim 1, in which the front member has a rearwardly projecting flange disposed below the said opening and underhanging the grille; the grille including upper and lower generally horizontal bars, rigid guard member spanning the said bars, and a plurality of laterally spaced brackets underhanging the grille; each bracket having its upper portion secured to the lower bar of the grille and its lower portion formed as a foot seated on the said flange; the said fastening means comprising bolts each extending through the said flange and one of the bracket fleet.

4. A finishing assembly for a radiator, comprising a front member having an air-admitting opening and including rearwardly extending and upwardly open hook elements disposed adjacent to the upper edge of the said opening; a grille disposed behind the front member and extending across the said opening, the grille including tongues projecting forwardly and downwardly from upper portions of the grille and respectively in hooking engagement with the said hook elements; and fastening means interposed between the said flange and the lower portion of the grille for drawing the grille downwardly to maintain the said hooking engagement.

5. A radiator finishing assembly as per claim 4, in which the front member has a rearwardly projecting flange disposed below the said opening and underhanging the grille; the height of the hook elements above the said flange being so proportioned to the height of the said tongues above the lower end of the grille that the grille seats on the said flange when the fastening means are tightened to draw the grille downwardly.

6. A radiator finishing assembly as per claim 4, in which the lines of engagement of some of the said hook elements with the corresponding tongues are oblique to the line of engagement of other hook elements with the associated tongues, whereby the said relative obliquity prevents a lateral shifting of the upper portion of the grille with respect to the front member.

7. A radiator finishing assembly as per claim 4, in which the grille includes upper and lower end bars and a guard portion spanning the said bars, and in which each of the said tongues has a rearward extension fastened to the upper end bar of the grille.

8. A radiator shell and grille assembly for an automobile, comprising a shell having a frontal opening bordered by a bead presenting an upwardly directed wall spaced rearwardly from the part of the front of the shell adjacent to the top of the opening; a grille housed by the shell and including upper and lower frame members disposed respectively at higher elevation than the top of the said opening and at lower elevation than lower edge portions of said opening; hook elements fast with respect to the upper frame member and in hooking engagement with the upper end of the said wall; and fastening elements operatively interposed between the lower frame member and portions of the shell adjacent thereto, the said wall and hook elements having relatively inclined interengaging portions whereby a tightening of the fastening means draws the grille forwardly against the portions of the shell.

9. A finishing assembly for a radiator comprising a front member provided with an air-admitting opening; a grille including a guard portion of greater height than the said opening and bearing forwardly against parts of the front member adjacent to the upper and lower edges of the said opening, the grille and front members also including interhooking elements disposed behind the said front above the said opening; and downwardly tightenable fastening means disposed below the said opening and interposed between the grille and the front member, the interhooking elements having relatively oblique interengaging portions affording a cam action whereby a tightening of the fastening means draws the upper portion of the grille forwardly toward the said shell front.

10. A finishing assembly for a radiator, comprising a front member having an air-admitting opening, and a separately constructed grille disposed behind the front member; the grille including an upper and a lower end bar, spaced louver bars spanning the end bars, and an auxiliary bar disposed between the said end bars and fastened to each of the louver bars; the front member having rearwardly extending integral portions disposed adjacent to the upper edge of the said opening and in interhooking association with the said upper end bar, and also having rearwardly extending integral portions respectively adjacent to opposite sides of the opening and in hooking engagement with the auxiliary bar, whereby the said integral portions hold the grille against the front member.

11. A radiator finishing assembly as per claim 8, in which the front member has rearwardly directed flanges adjacent to the upper and lower edges of the said opening, the said flanges engaging forward portions of the louver bars.

12. A radiator-finishing assembly as per claim 8, in which the front member has flanges extending rearwardly respectively along the upper and the lower edge of the said opening, and in which the fastening elements are arranged for drawing the grille forwardly to press the louver bars against the said flanges.

13. A frontal finishing assembly for a radiator, comprising: a front member having an air-admitting opening, a grille disposed behind the front member and including a guard portion extending effectively across the said opening, the grille also including a stiffening cross-bar secured to the said guide portion intermediate of the height of the grille; means operatively interposed between the front member and the grille for supporting the grille from the front member, and auxiliary means interposed between the said cross-bar and the front member for latching the grille to the front member.

14. A frontal finishing assembly for a radiator as per claim 13, in which the auxiliary means comprise two guide fingers extending rearwardly from the front member respectively at opposite sides of the said opening and respectively engaging opposite end portions of the stiffening cross-bar.

15. A frontal finishing assembly for an automobile radiator, comprising a front member having an air admitting aperture, and a grille disposed behind the front member, the front member including integral rearwardly extending elements which hookingly underhang upper portions of the grille, the grille also having an eye at each side thereof and the front member having integral rearwardly extending fingers respectively extending through and substantially fitting the bores of the said eyes to prevent a shifting of the grille in its own general plane with respect to the front member.

16. A frontal finishing assembly as per claim 13, in which the front member is constructed of sheet metal and formed to present rearwardly recurved flanges adjacent to the sides of the aperture, each of the said flanges having intermediate of the height of the flange a rearward extension constituting one of the said hookingly underhanging elements.

17. A radiator finishing assembly comprising a front member having an air-admitting opening and presenting hook elements behind the part of the front member above the said opening, a grille including in its upper portion hook elements disposed for engaging the hook elements on the front member to support the grille, the grille also including an eye at each lateral edge at a considerable distance below its said upper portion; the front member also including two rearwardly extending guide elements adapted to slide respectively through the said two eyes when the grille is moved forwardly toward the front member, each eye having upright bore walls engaging opposite faces of the corresponding guide element to prevent relative lateral shifting of the grille with respect to the front member.

18. A finishing assembly for a radiator, comprising a front member having an air-admitting opening and having a rearwardly projecting guide finger adjacent to each side of the opening, and a separately constructed grille disposed behind the front member; the grille including an upper and a lower end bar, spaced louver bars spanning the end bars, and an auxiliary bar disposed between the said end bars and fastened to each of the louver bars; the front member and the upper end bar including hookingly interengaging elements, and each end of the auxiliary bar having an eye through which one of the guide fingers is adapted to slide when the said elements are interengaged and the grille is then swung towards the front member, each guide finger having its rearward portion thereafter clinched against the back of the auxiliary bar.

19. A radiator finishing assembly as per claim 18, in which each guide finger substantially fits the bore of the eye through which it extends, whereby the guide fingers and the said eyes cooperate in preventing both lateral and vertical shifting of the grille with respect to the front member.

20. A radiator finishing assembly as per claim 18, in which the front member is formed of sheet metal and has an integral metal portion adjacent to each lateral edge of the opening bent rearwardly, the said metal portions presenting flat and parallel upright faces and constituting the said guide fingers.

21. A finishing assembly for an automobile radiator, comprising a front member having an air-admitting aperture, and a grille disposed behind the front member, the grille including substantially parallel guard elements extending effectively across the aperture, and also including a bar extending transversely of the said guard elements behind the latter and secured to the said elements; the bar presenting eyes respectively behind parts of the front member at opposite sides of the said opening, and the front member having portions thereof adjacent to opposite sides of the said opening bent rearwardly to form fingers respectively interlocked with the said eyes for clamping the grille against the front member.

22. A radiator-finishing assembly comprising a front member provided with an air admitting opening and presenting laterally spaced rearwardly and upwardly extending hook elements adjacent to the upper edge of the said opening; and a grille disposed behind the said front member, the grille including an upper end bar having portions thereof respectively in hooking engagement with the said hook elements, the said bar also having portions thereof extending respectively adjacent to each side of each of the hook elements to center the upper portion of the grille laterally of the front member with respect to the latter.

23. A radiator-finishing assembly comprising a front member provided with an air admitting opening and presenting rearwardly and upwardly extending hook elements adjacent to the upper edge of the said opening; and a grille disposed behind the said front member, the grille including an upper and a lower end bar and louver bars spanning the said end bars; the upper end bar including a web extending in front of upper portions of the louver bars, and having spaced portions thereof respectively in hooking engagement with the said hook elements, the said spaced portions of the said web being offset forwardly from adjacent portions of that web to permit the said hook elements to extend between the said spaced portions and louver bars adjacent to the latter.

24. A radiator-finishing assembly as per claim 23, in which the upper end bar of the grille also includes a second web extending rearwardly from the upper edge of the aforesaid web, and in which the grille includes guard elements secured at their upper end to the said second web.

25. A radiator finishing assembly as per claim 15, in which the front member presents shoulders respectively engaging the forward faces of the said eyes, and in which each finger has its rear end bent over to clamp the eye through which the finger extends against the shoulder engaging that eye.

LEE B. GREEN.